United States Patent
Barthel et al.

(10) Patent No.: US 8,142,753 B2
(45) Date of Patent: Mar. 27, 2012

(54) PYROGENIC SILICA PRODUCED IN A PRODUCTION FACILITY WITH HIGH CAPACITY

(75) Inventors: Herbert Barthel, Mehring (DE); Helmut Maginot, Burgkirchen (DE)

(73) Assignee: Wacker Chemie AG, Munich (DE)

( * ) Notice: Subject to any disclaimer, the term of this patent is extended or adjusted under 35 U.S.C. 154(b) by 277 days.

(21) Appl. No.: 12/514,749

(22) PCT Filed: Nov. 8, 2007

(86) PCT No.: PCT/EP2007/062065
§ 371 (c)(1),
(2), (4) Date: May 13, 2009

(87) PCT Pub. No.: WO2008/058894
PCT Pub. Date: May 22, 2008

(65) Prior Publication Data
US 2010/0025373 A1 Feb. 4, 2010

(30) Foreign Application Priority Data
Nov. 16, 2006 (DE) .......... 10 2006 054 156

(51) Int. Cl.
*C01B 33/18* (2006.01)
*G03G 9/087* (2006.01)
(52) U.S. Cl. ........ 423/337; 423/335; 423/336; 106/482; 430/108.7
(58) Field of Classification Search .......... 423/335–337; 106/482; 430/108.7
See application file for complete search history.

(56) References Cited

U.S. PATENT DOCUMENTS

| | | | |
|---|---|---|---|
| 4,565,682 A | 1/1986 | Loskot et al. | |
| 5,340,560 A * | 8/1994 | Rohr et al. | 423/337 |
| 5,682,929 A | 11/1997 | Maginot et al. | |
| 6,063,354 A | 5/2000 | Mangold et al. | |
| 6,932,953 B2 * | 8/2005 | Nishimine et al. | 423/337 |
| 7,910,081 B2 * | 3/2011 | Liu et al. | 423/337 |
| 2006/0155052 A1 | 7/2006 | Schumacher et al. | |
| 2008/0045411 A1 | 2/2008 | Morters et al. | |
| 2008/0141904 A1 | 6/2008 | Barthel et al. | |

FOREIGN PATENT DOCUMENTS

| | | |
|---|---|---|
| CN | 1726170 A | 1/2006 |
| EP | 0054530 A1 | 6/1982 |
| EP | 0097378 A2 | 1/1984 |
| EP | 0773159 B1 | 5/1997 |
| EP | 0855368 A1 | 7/1998 |
| EP | 1213263 A2 | 6/2002 |
| EP | 1693343 A2 | 8/2006 |
| JP | 07144929 A | 6/1995 |
| WO | 2004054929 A1 | 7/2004 |
| WO | 2006087136 A2 | 8/2006 |

OTHER PUBLICATIONS

Ullmann's Encyclopedia of Industrial Chemistry (Wiley—VCH Verlag GmbH & Co., KGaA, 2002).

* cited by examiner

*Primary Examiner* — Stanley Silverman
*Assistant Examiner* — Diana J Liao
(74) *Attorney, Agent, or Firm* — Brookes Kushman P.C.

(57) ABSTRACT

A large scale process for preparing fumed silica with consistent product parameters wherein a silica precursor compound is fed to a burner at $\geq 100$ Kg/h along with a combusting gas at $\geq 300$ m$^3$/h and a combustible gas at $\geq 100$ m$^3$/h, with a nozzle gas velocity between 10 and 200 m/s, and a radially symmetrical, homogenous gas velocity and gas temperature.

26 Claims, 2 Drawing Sheets

PYROGENIC SILICA PRODUCED IN A PRODUCTION FACILITY WITH HIGH CAPACITY

CROSS-REFERENCE TO RELATED APPLICATION

This application is the U.S. national phase of PCT Appln. No. PCT1EP20071062065 filed Nov. 8, 2007 which claims priority to German application DE 10 2006 054 156.1 filed Nov. 16, 2006.

BACKGROUND OF THE INVENTION

1. Field of the Invention

The invention pertains to fumed silica, and to a high capacity process and an apparatus for preparing fumed silica.

2. Description of the Related Art

Pyrogenic metal oxides, for example fumed silica, are obtained by high-temperature hydrolysis of halosilicon compounds in a hydrogen-oxygen flame, as described, for example, in Ullmann's Encyclopedia of Industrial Chemistry (Wiley-VCH Verlag GmbH & Co. KGaA, 2002). For many applications, not only the intrinsic quality but in particular also the constancy of these properties, individually and also in combination, is of high significance. This is true in particular of the use of the fumed silica in applications in the surface coating industry, in thermal insulation applications, in applications as a flow assistant in dry powders, in sealant applications, for example in silicone sealants and polyurethane sealants which crosslink at room temperature under the influence of moisture, for use for components in the automobile industry such as adhesives, and for use as a consumable in the manufacture of electronic semiconductor components, such as processors, memory, controllers and integrated circuits.

A known problem is, for example, inadequate dispersibility of the fumed silica in silicone materials such as silicone sealants, and in polyalkylene oxide-containing sealants such as polyurethanes.

Another problem which has often been described is that of defects as a result of scratches which occur when silica is used in chemomechanical polishing and planarizing applications on electronic components on wafers.

For the construction of a large production plant, especially for the design, construction and operation of a large production plant, however, simple scale-up is impossible, since the enlargement of the reactor, for example, increases the size of the flame and hence essential quality-determining parameters which are determined via the residence time in the hot zone change significantly with a plant enlargement.

SUMMARY OF THE INVENTION

It is an object of the invention to overcome the disadvantages of the prior art and more particularly to provide a process and an apparatus for preparing fumed silica and a silica in large quantities which has a high quality and constancy of quality. These and other objects are surprisingly achieved in a process employing at least 100 Kg/h of one or more silicon compounds, with a burner which has an exit velocity between 10 and 200 m/s, the gas velocity and the temperature of the gases at the nozzle of the burner and in the reactor having a radially homogenous distribution.

DETAILED DESCRIPTION OF THE PREFERRED EMBODIMENTS

The invention thus provides a process for preparing fumed silica which has a specific surface area, measured according to BET, preferably from 30 to 500 $m^2/g$, more preferably from 70 to 330 $m^2/g$, yet more preferably from 80 to 230 $m^3/g$, and most preferably from 80 to 170 $m^2/g$, and a mean aggregate particle size, measured as the sphere-equivalent hydrodynamic diameter, of preferably from 100 to 500 nm, more preferably from 150 to 350 nm, most preferably from 150 to 250 nm, and a relative thickening action $\eta/\eta 0$ of greater than 2.0, preferably greater than 4.0, more preferably greater than 6.0, most preferably greater than 7.5, and a proportion of less than 0.03% by weight, preferably less than 0.015% by weight, more preferably less than 0.008% by weight of coarse particles, these coarse particles preferably being coarse particles larger than a diameter 10 µm, more preferably larger than 40 µm, based on the fumed silica, and fewer than 100,000 coarse particles, preferably fewer than 20,000 coarse particles, more preferably fewer than 10,000 coarse particles, yet more preferably fewer than 5000 coarse particles, and most preferably fewer than 1000 coarse particles larger than 10 µm, more preferably larger than 1.5 µm, yet more preferably larger than 1.0 µm, and most preferably larger than 0.56 µm per 1 milliliter (ml or $cm^3$), preferably based on a from 1 to 50% by weight and more preferably on a 10% by weight aqueous dispersion of the silica, the reaction gases being reacted in a flame in a reactor in a flame in an amount of at least one silicon compound of greater than 100 kg/h, preferably greater than 250 kg/h, more preferably greater than 500 kg/h, yet more preferably greater than 800 kg/h, and most preferably greater than 1500 kg/h, an amount of combustion gas of greater than 100 $m^3$ (STP)/h, preferably greater than 250 $m^3$ (STP)/h, more preferably greater than 500 $m^3$ (STP)/h, yet more preferably greater than 1000 $m^3$ (STP)/h, and an amount of air with more than 20% by volume of oxygen of greater than 300 $m^3$ (STP)/h, preferably greater than 1000 $m^3$ (STP)/h, more preferably greater than 2000 $m^3$ (STP)/h, even more preferably greater than 3000 $m^3$ (STP)/h, and most preferably greater than 5000 $m^3$ (STP)/h, the nozzle exit velocity or the gas velocity of the gases used at the reactor nozzle, based on standard volumes, being between 10 and 200 m/s, preferably between 30 and 150 m/s, yet more preferably between 50 and 120 m/s, and the gas velocity over the nozzle cross section preferably having a radially homogeneous distribution, and also preferably being distributed radially very substantially homogeneously over the reactor cross section.

Preferably, the relative thickening action $\eta/\eta 0$ of the fumed silica is measured as the quotient of the viscosity $\eta$ of a liquid medium which comprises the fumed silica, measured at a temperature of 25° C., and of the viscosity $\eta 0$ of a liquid medium which contains no fumed silica, measured at a temperature of 25° C. Examples of liquid media are mixtures of a polyester resin, for example approx. 65% by weight, for example, of a condensation product of ortho-phthalic anhydride or maleic anhydride on the one hand, and of a diol, for example 1,2-propanediol, on the other hand, in a solvent, for example approx. 35% by weight, for example, of a reactive monomer, for example monostyrene, or silicone oils, for example preferably polydimethylsiloxane, preferably end-capped with trimethylsiloxy groups, preferably one with a viscosity at 25° C. of from 0.5 to 5.0 Pas, preferably 0.9-2.1 Pas, more preferably approx. 1.0 Pas. The amount of fumed silica in the liquid medium is preferably from 1 to 5% by weight, more preferably from 1.8 to 3.4% by weight, most preferably 2% by weight.

The viscosity is preferably measured at a temperature of 25° C. and at the same constant shear rate, preferably at a constant shear rate of from 0.5 to 200 l/s, more preferably at from 0.9 to 20 l/s, most preferably at 10 l/s.

The fumed silica is preferably dispersed in the liquid medium with optimal dispersion, for example with a toothed disk dissolver at a peripheral speed of from 4 to 20 m/s, preferably at 11 m/s, preferably over an optimal period, more preferably over from 3 to 10 minutes, most preferably over approx. 5 minutes.

In another preferred embodiment, the surface-based relative thickening action $\eta/\eta 0$-BET of the fumed silica is from 4.0 to 8.0, preferably from 5.5 to 7.0, using a BET surface area-based relative starting weight of the silica of twice f% by weight, where f=(200 m$^2$/g)/BET silica, where BET silica is the specific surface area of the silica measured according to BET.

The mean aggregate particle size is preferably measured as the mean sphere-equivalent hydrodynamic diameter, preferably measured by photocorrelation spectroscopy or dynamic light scattering or quasi-elastic light scattering, at an angle of from 1 to 179°, preferably at approx. 90°, or, in another preferred embodiment, in backscatter at an angle of from 170° to 179°, preferably at approx. 173°, for example with the Malvern Zetasizer® or Malvern Nanosizer® instrument, and readout of the Z-average value by a cumulant analysis or the standard algorithm, as the mean aggregate diameter and preferably after dispersion at 0.3% by weight in water of pH 10, preferably adjusted with ammonia, and preferably with dispersion with a magnetic stirrer, preferably at from 100 to 500 revolutions per minute, more preferably at 300 revolutions per minute, and with ultrasound, preferably an ultrasound tip at 75-95% power, more preferably at 90% power, for example a Bandelin UM60 ultrasound tip, over from 1 to 15 minutes, preferably from 5 to 10 minutes, more preferably 5 min., at a temperature of 25° C.

The proportion of coarse particles, for example sintered particles, is preferably determined gravimetrically. An example of a suitable test method here is a gravimetric determination of the screen residue after screening of the silica slurried with water with screens of mesh sizes less than 100 μm, preferably less than 40 μm, more preferably less than 10 μm. A particularly preferred example of this is the Mocker method, for example by means of a water jet and a 40 μm screen (oversize >40 μm).

The proportion of coarse particles is preferably determined as coarse sintered particles having a density of from 200 to 2500 g/l and having a diameter of from 0.5 to 500 μm. An example of a suitable analysis method is the use of an optical centrifuge, for example the LUMifuge® instrument.

Preferably, the proportion of coarse particles in the fumed silica prepared by the process according to the invention is measured on an aqueous dispersion, or chemical formulation based on such a dispersion which has been prepared from the silica, in which, after optimal dispersion, for example with a rotor-stator disperser at greater than 1000 revolutions per minute, preferably at greater than 10.000 revolutions per minute, more preferably greater than 25,000 revolutions per minute, and a dispersion time of greater than 1 minute, preferably greater than or equal to 5 minutes, and optimal stabilization, for example alkaline stabilization at pH 9-11, preferably pH 9.9 to 10.2, by commercial counting methods for determining large particles, for example based on light extinction processes, for example white light or laser light, for example with an Accusizer® 680 or 780 instrument, or a Liquilaz® instrument from PSM, Oregon, USA, or an FAS® instrument from Topas, Germany.

In another preferred embodiment, the proportion of coarse particles in the fumed silica prepared by the process according to the invention is measured on an aqueous dispersion, or chemical formulation based on such a dispersion which has been prepared from the silica, in which, after optimal dispersion, for example with a rotor-stator disperser at greater than 1000 revolutions per minute, preferably at greater than 10,000 revolutions per minute, more preferably greater than 25,000 revolutions per minute, and a dispersion time of greater than 1 minute, preferably greater than or equal to 5 minutes, and optimal stabilization, for example alkaline stabilization at pH 9-11, preferably pH 9.9 to 10.2, and after removal of the fine fumed silica, as non-silica particles and coarse silica particles, such as coarse and/or dense sintered particles with a density of from 200 to 2500 g/l and with a diameter of from 0.5 to 500 μm, by commercial counting methods for determining large particles, for example based on light extinction processes, for example white light or laser light, for example with an Accusizer® 680 or 780 instrument, or a Liquilaz® instrument from PSM, Oregon, USA, or an FAS® instrument from Topas, Germany.

Preferably, the fumed silica prepared by the process according to the invention then comprises, after the above-described removal of the fine fumed silica, in an aqueous dispersion, fewer than 10,000 coarse particles, preferably fewer than 2000 coarse particles, more preferably fewer than 1000 coarse particles, yet more preferably fewer than 500 coarse particles, and most preferably fewer than 100 coarse particles, which are larger than 10 μm, more preferably larger than 1.5 μm, yet more preferably larger than 1.0 μm, and most preferably larger than 0.56 μm, per ml.

Fumed silica and non-silica particles and coarse particles can be removed by filtration, for example in a filtration in which the coarse particles remain on a separation or filter medium and can thus be separated from the fumed silica, and can thus be sent to visual or visual digital evaluation by microscopy. In another preferred embodiment, the fine fumed silica can also be removed from the coarse particles by chemical dissolution and solubilization. The fine colloidal fraction of the fumed silica can be dissolved by known chemicals which dissolve silicon dioxide, such as alkaline aqueous solutions as obtained by adding alkali metal hydroxide, preferably potassium hydroxide, or alkaline earth metal hydroxides, to water. Other preferred chemicals are soluble alkali metal fluorides or alkaline earth metal fluorides, preferably in mixtures with mineral acids, for example hydrochloric acid, sulfuric acid or nitric acid, or hydrofluoric acid, or hydrofluoric acid in mixtures with mineral acids, for example sulfuric acid.

The proportion of gaseous or vaporous or volatile silicon-containing compounds in the reaction gas which is supplied to the reaction is preferably from 1% by volume to 20% by volume, more preferably from 1% by volume to 10% by volume, and most preferably from 5% by volume to 10% by volume.

The proportion of air or air-oxygen mixtures in the reaction gas which is supplied to the reaction is preferably from 50% by volume to 99% by volume, more preferably from 60% by volume to 80% by volume, and most preferably from 70% by volume to 80% by volume.

The proportion of combustion gas in the reaction gas which is supplied to the reaction is preferably from 1% by volume to 25% by volume, more preferably from 3% by volume to 20% by volume, and most preferably from 10% by volume to 20% by volume.

The reaction gases comprising at least one silicon compound preferably in gaseous or vaporous form, or a mixture of silicon compounds, are introduced into the reaction chamber or flame in an amount of from 100 to 10,000 m³ (STP)/h, preferably from 1000 to 10,000 m³ (STP)/h and more preferably 1000-7500 m³ (STP)/h, the nozzle exit velocity of the gases used at the reactor nozzle being between 10 and 200 m/s, preferably from 25 to 200 m/s, more preferably from 50 to 120 m/s.

The reaction gases contain hydrogen at from 10 to 2000 m³ (STP)/h, preferably from 100 to 1500 m³ (STP)/h, more preferably from 500 to 1200 m³ (STP)/h, and air with more than 20% by volume of oxygen at from 100 to 10,000 m³ (STP)/h, preferably from 1000 to 7500 m³ (STP)/h, more preferably from 2500 to 7500 m³ (STP)/h.

The gas velocity is preferably in a radially homogeneous distribution over the nozzle cross section.

The gas velocity is preferably in a radially very substantially homogeneous distribution over the reactor cross section.

The gas velocity is preferably in a radially homogeneous distribution over the reaction zone cross section.

"Preferably in radially homogeneous distribution" means here preferably that the gas velocity is in a radially symmetric distribution based on the central longitudinal axis of the flame.

"Radially symmetric based on a central longitudinal axis of the flame" preferably means here that deviations from symmetry in the gas velocities are less than 50%, preferably less than 10%, more preferably less than 1%, and most preferably less than 0.1%.

"Preferably in radially homogeneous distribution" means here preferably that the central longitudinal axis of the flame corresponds to the central longitudinal axis through the centers of nozzle cross section and reactor cross section, i.e. deviates preferably by less than 30°, more preferably less than 15°, more preferably less than 5°, in particular less than 1°.

"In homogeneous distribution" means here preferably that the greatest gas velocity is less than twice, preferably less than 1.5 times, more preferably less than 1.2 times, most preferably less than 1.05 times, greater than the smallest gas velocity at equal distance from the nozzle and at equal distance from the central longitudinal axis through the centers of nozzle cross section and reactor cross section.

"In homogeneous distribution" means here preferably that the deviation from an ideal radial distribution of the gas velocity based on a central axis of the flame, determined as the quotient of two diameters at right angles to one another, determined as the quotient of the smaller diameter divided by the greater diameter, is greater than 0.2, preferably greater than 0.5, more preferably greater than 0.8, yet more preferably greater than 0.9, and most preferably greater than 0.99, at the same distance from the nozzle.

The temperature is preferably in radially homogeneous distribution over the reactor cross section.

The temperature is preferably in radially homogeneous distribution over the reaction zone cross section.

"Preferably in radially homogeneous distribution" means here preferably that the temperature is in radially symmetric distribution based on the central longitudinal axis of the flame.

"Radially symmetric based on a central longitudinal axis of the flame" means here preferably that deviations from symmetry in the temperatures are less than 50%, preferably less than 10%, more preferably less than 1%, and most preferably less than 0.1%.

"Preferably in radially homogeneous distribution" means here preferably that the central longitudinal axis of the flame coincides with the central longitudinal axis through the centers of nozzle cross section and reactor cross section, i.e. deviates preferably by less than 30°, more preferably less than 15°, yet more preferably less than 5°, and in particular less than 1°.

"In homogeneous distribution" means here preferably that the greatest temperature is less than twice, preferably less than 1.5 times, more preferably less than 1.2 times greater than the smallest temperature at the same distance from the nozzle and at the same distance from the central longitudinal axis through the centers of nozzle cross section and reactor cross section.

"In homogeneous distribution" means here preferably that the deviation from an ideal radial distribution of the temperature based on a central axis of the flame, determined as the quotient of two diameters at right angles to one another, determined as the quotient of the smaller diameter divided by the greater diameter, is greater than $O_2$, preferably greater than 0.5, more preferably greater than 0.8, yet more preferably greater than 0.9, and most preferably greater than 0.99, with the same distance from the nozzle.

The alignment of the flame may be horizontal or vertical or assume any desired angle. The direction of the flame may be from the bottom upward or from the top downward. The direction from the top downward is preferred.

The reactor chamber is preferably from 5 to 40 m long, more preferably from 10 to 25 m long.

The reactor chamber preferably has, at the top, a diameter of from 0.2 to 2.0 m, more preferably from 0.5 to 1.5 m.

The reactor chamber preferably has a circular cross section.

The reaction nozzle preferably has a circular cross section.

The reactor chamber is preferably, within 20% of the reactor length, 1%, more preferably 10%, and most preferably 50%, wider than the reactor chamber at the top of the reactor.

The reactor nozzle is preferably from 0.05 to 0.25 m, more preferably from 0.1 to 0.2 m, in diameter.

The exit surface area of the reactor nozzle is preferably from 0.001 m² to 0.1 m², more preferably from 0.002 to 0.05 m², most preferably from 0.008 m² to 0.03 m², in size.

Backflow of the gases in the reaction chamber is preferably less than 50% by volume, more preferably less than 10% by volume, yet more preferably less than 1% by volume, and most preferably less than 0.1% by volume, of the overall gases. Exceptionally preferably, there is no backflow.

The gas exit velocity at the nozzle is preferably at a minimum.

The velocity in the reactor chamber is preferably at a minimum.

The reaction gases are preferably oxygen, i.e., for example, air which may be fresh or dried, a combustion gas, for example hydrogen, a vaporous hydrocarbon (saturated or unsaturated, i.e. containing double and/or triple bonds), such as methane, ethane, isopropane, n-propane, isobutane, n-butane, ethene, ethyne, propene, isobutene and n-butene, and other higher iso- or n- or neo-alkanes, -alkenes and -alkynes, lower alcohols such as methanol, ethanol, propanol, preference being given to methane, or mixtures thereof, preference being given to a combustion gas containing greater than 90% by volume of hydrogen, and preference being given to a combustion gas containing greater than 1% by volume of natural gas containing greater than 90% by volume of methane, and silane containing at least one vaporous silicon-containing compound such as $R_xH_ySi_aX_zY_b$ where R is an alkyl radical having from 1 to 8 carbon atoms, preferably a methyl radical, H is hydrogen, X is a halogen or an alkoxy group OR, preferably Cl, Y is oxygen, and a>0 and is an integer.

When a=1, b=0, and then x+y+z=4; preferred examples are x=1 or y=1 and z=3; more preferably, z=4 and X is chlorine.

When a=2, x+y+z=6 and b is 0 or 1, and also further vapors or gases, preferably less than 10% by volume, which do not disrupt the reaction, such as $N_2$, Ar, He, $CO_2$.

Examples of the silicon compound are silicon tetrachloride, hydrogen silicon trichloride, methyl silicon trichloride, and mixtures thereof; for reasons of economic viability and of quality, preference is given to mixtures which contain silicon tetrachloride as the main constituent, preferably from processes which serve to prepare amorphous, polycrystalline or monocrystalline silicon metal, for example silicon for the electronics or semiconductor or photovoltaics industry.

Owing to their preparation process, the silicon compounds or mixtures thereof may comprise gaseous, vaporous or evaporable and volatile impurities, such as methane, ethane, isopropane, n-propane, isobutane, n-butane, ethene, ethyne, propene, isobutene and n-butene, and other higher iso- or n- or neoalkanes, -alkenes and -alkynes, lower alcohols such as methanol, ethanol, propanol, or mixtures thereof, or alkyl-substituted, optionally haloalkyl-substituted, such as chloroalkyl-substituted, gaseous, vaporous or evaporable organosilicon compounds, or hydrogen or nitrogen or argon or natural gas or carbon oxides, such as carbon monoxide or carbon dioxide.

In a preferred embodiment, this may be silicon tetrachloride from the disproportionation and reaction of hydrogen silicon trichloride at temperatures greater than 500° C., preferably greater than 700° C., more preferably greater than 850°, to form silicon tetrachloride, silicon metal and hydrogen. The silicon tetrachloride can be removed and purified by distillation.

In an embodiment which is preferred for technical and economic reasons or else for reasons of product quality, the silicon-containing compound, or mixtures thereof, or the silane, has a content of greater than 90% by volume of silicon tetrachloride, more preferably greater than 95% by volume of silicon tetrachloride, more preferably greater than 97% by volume of silicon tetrachloride, most preferably greater than 99% silicon tetrachloride, where the remaining proportion in the mixture may be hydrogen silicon trichloride and hydrogen silicon dichloride.

In another embodiment which is preferred for economic reasons and may be based on the presence of large amounts of methyl silicon trichloride, methyl silicon trichloride is preferred.

In another embodiment which is preferred for economic reasons and may be based on the presence of large amounts of hydrogen silicon trichloride, hydrogen silicon trichloride is preferred.

In another embodiment which is preferred for economic reasons, mixtures of silicon tetrachloride and hydrogen silicon trichloride are preferred.

In another embodiment which is preferred for economic reasons, mixtures of silicon tetrachloride, methyl silicon trichloride and hydrogen silicon trichloride are preferred.

In a particularly preferred embodiment, mixtures which contain greater than 10% by volume of hydrogen silicon trichloride, most preferably greater than 20% by volume of hydrogen silicon trichloride, are used.

In another particularly preferred embodiment, mixtures which contain 30% by volume of hydrogen silicon trichloride are used.

In another particularly preferred embodiment, mixtures which contain greater than 1% by volume of methyl silicon trichloride, even more preferably 10% by volume of methyl silicon trichloride, particularly preferably greater than 50% by volume of methyl silicon trichloride, are used.

Preferably, the oxygen for use in the reactor is taken from the air from the surrounding atmosphere. In other words, air can be supplied to the reactor. The oxygen, $O_2$, in the air can be enriched to greater than 20% by volume, for example by adding pure oxygen, $O_2$, or by adding air which contains greater than 20% by volume of oxygen, $O_2$.

The air can be used as such, or can be predried by condensation and/or absorption of the water at less than 0° C., particularly at less than −20° C.

In a preferred embodiment of the process for preparing fumed silica, a further reactor nozzle which surrounds, in an annular manner, the reactor nozzle from which the reaction gases emerge is used to additionally supply pure oxygen or air or air-oxygen mixtures or additionally supply pure nitrogen or air or air-nitrogen mixtures.

In a preferred embodiment of the process for preparing fumed silica, further air can be introduced into the combustion chamber outside the nozzle at the top of the combustion chamber.

In a preferred embodiment, the hydrogen chloride, HCl, formed in the reaction is recovered by absorption and desorption, purified and dried.

In a further preferred embodiment, the dry hydrogen chloride, HCl, thus obtained is used to prepare chlorosilanes such as silicon tetrachloride, hydrogen silicon trichloride, dihydrogen silicon dichloride and trihydrogen silicon chloride, in particular hydrogen silicon trichloride, from silicon metal.

Examples of a preferred use are a reaction and production of methylchlorosilanes according to a generally simplified empirical formula $$Si + 3HCl \rightarrow HSiCl_3 + H_2$$

to form reaction by-products such as silicon tetrachloride, hydrogen silicon trichloride and others, or a reaction and production of methylchlorosilanes according to a generally simplified empirical formula $$HCl + CH_3OH \rightarrow CH_3Cl + H_2O$$

and, after separation of methyl chloride and water, optionally dried methyl chloride is used for reaction with metallic silicon $$Si + 2CH_3Cl \rightarrow (CH_3)_2SiCl_2$$

which may form reaction by-products, such as methyl silicon trichloride, $CH_3SiCl_3$, trimethyl silicon chloride, $(CH_3)_3SiCl$ and others.

Examples of chemical reactions for the preparation are the oxidation of the combustion gas with atmospheric oxygen, in which temperatures of from 1000 to 2000° C. are achieved in the reaction zone, and high-temperature hydrolysis by the water formed when a=1 and X=Cl and z=4, or oxidation of the silane and high-temperature hydrolysis for other values of a, b, x, y and z of the Si-bonds by the water formed.

Preferred examples of the reaction are:

Formation of water $$O_2 + 2H_2 \rightarrow 2H_2O$$

High-temperature hydrolysis $$SiCl_4 + 2H_2O \rightarrow 4HCl + SiO_2 \text{ (fumed silica)}$$

Oxidation, formation of water and high-temperature hydrolysis $$HSiCl_3 + O_2 + H_2 \rightarrow 3HCl + SiO_2 \text{ (fumed silica)}$$

Oxidation, formation of water and high-temperature hydrolysis $$CH_3SiCl_3 + 2O_2 \rightarrow 3HCl + CO_2 + SiO_2 \text{ (fumed silica)}$$

Preferably, the capacity of a production plant in the process according to the invention is greater than 1000 tonnes, more preferably greater than 5000 tonnes, yet more preferably greater than 7500 tonnes, and most preferably greater than 10,000 tonnes of fumed silica, based on one calendar year, preferably based on 7884 hours of production time.

In a preferred embodiment, the fumed silica is prepared at a throughput in an individual reactor with a capacity of greater than 1,000,000 kg, preferably greater than 5,000,000 kg, more preferably greater than 7,500,000 kg, and most preferably greater than 10,000,000 kg, per 7884 hours, of greater than 125 kg/h, more preferably 300 kg/h, yet more preferably greater than 750 kg/h, and most preferably greater than 1000 kg/h.

In a preferred embodiment, the size of the reaction zone can be varied by varying the amount of the combustion gases.

In a preferred embodiment, the size of the reaction zone can be varied by varying the throughput of the combustion gases.

In a further particularly preferred embodiment, the size of the reaction zone can be varied by varying the geometry of the reactor nozzle.

The gas velocity of the reaction gases at the reactor nozzle can preferably be set between 10 and 200 m/s, preferably from 30 to 150 m/s, more preferably 50-120 m/s, the gas velocity of the reaction gases at the reactor nozzle being settable even during the course of the process to a velocity between 10 and 200 m/s, preferably up to 150 m/s, more preferably 50-120 m/s.

To set the velocity, preference is given to using equipment and apparatus which enables an optimal adjustment, which is detected empirically or by calculation, of the flow rate of the reaction gases and of the reactor nozzle cross section to the throughput.

A variable nozzle can cover various states, from startup (characterized by low flow rates) up to full load (characterized by high flow rate).

Preferably, in the case of low throughput, the flame can be started with a relatively low gas flow of reaction gases.

Preferably, the flame is started with the required gas flow of reaction gases, which prevents backfiring of the flame and ensures its stability.

Preferably, in the case of lower throughput and on starting, the cross section of the nozzle is preferably reduced.

Preferably, in the case of high throughput, the cross section of the nozzle is enlarged.

In a preferred embodiment, the reaction gases are fed in from preferably two or more reactor nozzles spaced apart.

Preferably, the reaction gases are premixed before entry into the reactor, preferably premixed homogeneously. The reaction gases are preferably premixed in the gas stream which is introduced into the nozzle in the reactor, especially premixed intensively.

In a further preferred embodiment, a further reactor nozzle which surrounds, in an annular manner, the reactor nozzle from which the reaction gases emerge is preferably used to additionally supply oxygen or oxygen which is present in the air.

In a preferred embodiment, the hot process gases are quenched in the reactor by supplying preferably slightly superheated steam, which has preferably been diluted with air, preferably hot air, i.e. the reaction is moderated and stopped with water.

Preference is given to also performing continued combustion of residual oxygen and chlorine gas, by adding a combustion gas to the flame at at least one site other than the reactor nozzle in the reactor chamber.

Preferably, further combustion gas, for example hydrogen, can be added to the reaction zone at different points in the reaction chamber. This additional hydrogen is preferably used to reduce chlorine, chlorine gas formed in the reactor to HCl.

Preference is given to a preparation process of silica in which the chlorine loss is less than 10% by weight, better less than 5% by weight, even better less than 1% by weight.

This additionally added hydrogen may preferably contain nitrogen, preferably from 0.001 to 90% by volume, preferably 30-70% by volume.

In another preferred embodiment, the hydrogen does not contain any nitrogen, $N_2$.

Preferably, hydrogen is supplied to the reactor as combustion gas.

Preferably, only hydrogen and no further combustion gas is used. Preference is given to suppressing the formation of carbon oxides, such as carbon monoxide, CO, and the formation of chlorinated aromatic hydrocarbons, for example chlorinated dibenzodioxins.

In one possible embodiment, this is hydrogen from the catalytic thermal conversion of, for example, methanol to carbon dioxide, $CO_2$, and hydrogen.

In a further preferred possible embodiment, this is hydrogen from the catalytic thermal conversion of hydrocarbons and water to carbon dioxide, $CO_2$, and hydrogen. Carbon dioxide, $CO_2$, can be removed absorptively and adsorptively; the hydrogen can thus be purified.

In another preferred embodiment, this is hydrogen from the disproportionation and reaction of the hydrogen silicon trichloride at temperatures greater than 500° C., preferably greater than 700° C., to form silicon tetrachloride, silicon metal and hydrogen.

The hydrogen can also preferably be purified by low-temperature condensation of other constituents.

In another preferred embodiment, hydrogen which forms in the reaction of silicon metal with HCl to form hydrogen silicon trichloride is used.

The process for preparing fumed silica preferably comprises the following, preferably successive steps: (1) silane provision, silane evaporator, optionally air processing, (2) reactor, (3) energy recovery and cooling, (4) optional preliminary removal of the silica $SiO_2$ by preferably one cyclone, or a plurality thereof, removal of the silica $SiO_2$ by preferably filters, preferably mesh filters, more preferably surface filters, (5) purification of the silica to remove last traces of hydrogen chloride HCl in a dryer, preferably a rotating drum dryer, preferably with internals which preferably achieve combined radial and vertical motion, or preferably in a fluidized bed or a moving bed, preferably with supply of gases such as air or nitrogen or inert gas, preferably at temperatures greater than 100° C., more preferably greater than 300° C., better greater than 500° C., with a superficial gas velocity of 0.1-100 cm/s, more preferably 1-10 cm/s, preference being given to measuring the traces of HCl analytically by a measurement of the pH, for example by suspending 4 g of silica in 100 ml of water, and (6) preferably homogenization, for example by mixing and fluidization in a silo of a particular defined amount of silica to give a homogeneous charge, e.g. 1-20 to, preferably 5-10 to, (7) storage in silos and (8) optional compaction, for example with roll compacters, screw compacters, piston compacters, preferably roll compacters, (9) transfer to containers, for example to 5-20 kg sacks, sacks consisting preferably of multilayer paper, optionally coated with one or more layers, preferably polyethylene coated, preferably perforated with small holes, or in big bags of 50-500 kg, preferably made of polyethylene or polypropylene, preferably 2-ply or multiply, for example as described in EP773159B1, or in large containers such as silo trucks, silotainers, preferably silotainers which contain an internal container or internal sack or inliner for protection of the silica from impurities, for example made of polyethylene or polypropylene, of capacity 500-5000 kg.

The generation of the gas temperature in a fluidized bed, or a moving bed, for purifying the fumed silica, for example to remove HCl, preferably with supply of gases such as air or nitrogen or inert gas, for purifying the silica to remove HCl, can be effected by electrical heating of the gas or, for reasons of economic viability and of protection of energy resources, by burning a combustion gas such as hydrogen, methane, ethane, propane, butane with air or oxygenous gas; preference is given to using hydrogen for this purpose.

In a preferred embodiment, no additional water is added in the overall process, apart from the water which forms through the reaction of the reaction gases.

In another preferred embodiment, before, preferably during, or after the purification of the fumed silica, preferably to improve the desorption of HCl from the silica, steam is additionally added.

In another preferred embodiment, steam is added to standardize and eliminate residual reactivity from the silica surface to stabilize the silica; this can simultaneously achieve conditioning of the silica surface, preferably toward reaction with atmospheric humidity.

The quality of the silica product is preferably checked at regular intervals by sampling and analysis of these samples with methods typical for silica, such as the specific surface area, for example measured according to BET, or, for example, measured by acid-based titration, for example as described in Sears et al., such as the particle size, for example the mean aggregate diameter, for example as the hydrodynamic diameter, for example measured by dynamic light scattering, or methods specified hereinafter, such as the pH, for example measured as the pH of a dispersion of 4% by weight of silica in water, such as the screen residue of coarse constituents, for example measured by the method according to Mocker by means of a water jet and a 40 µm screen, or as counting methods for analysis of coarse particles, for example with white light or laser light extinction and counting methods, as described above, such as the thickening action in liquid media, for example as described above, preferably according to defined protocols.

The sample is preferably taken with a specific sampling device.

The fumed silica prepared by the process according to the invention preferably has a narrow distribution of the analysis values obtained by the above-described or other analysis methods typical for the fumed silica, for example specific surface area, thickening action and particle size. Narrow distribution here means a narrow normal distribution for more than 10, preferably more than 30, more preferably more than 50, within one year, batches produced in direct succession or else at time intervals, with a batch size of typically 10 to 12 to per batch. Preferably, three times the standard deviation SIGMA of the standard distribution of the dataset which has been obtained from an analysis process on the batches of such a fumed silica prepared by the process according to the invention is less than 50%, preferably less than 25%, more preferably less than 10%, and most preferably less than 5%, of the analysis value.

Preferably, the cpk value of the process, based on the data of analysis methods typical for silica, preferably of the above-described fumed silica prepared by the process according to the invention, is greater than 1.0, preferably greater than 1.33, more preferably greater than 1.5.

Preferably, the BET surface area measured on 100 different samples of these 7000 tonnes preferably has a normal distribution and a standard deviation SIGMA of less than 10%, more preferably less than 5%, most preferably less than 2.5%, of the mean. Preferably, the mean particle size measured on 100 samples of these 7000 tonnes preferably has a normal distribution of standard deviation SIGMA of less than 10%, more preferably less than 4%, most preferably less than 1.5%, of the mean.

The invention further provides an apparatus for preparing fumed silica, characterized in that it comprises a reactor, a feed device for the reaction gases, a reactor nozzle, and in that the reactor has further feed devices for supplying air.

The inventive apparatus for preparing fumed silica has the following units: silane provision, silane evaporator, optionally air processing, (a) reactor, (b) energy recovery and cooling, (c) optional preliminary removal of the silica $SiO_2$ by preferably one cyclone, or a plurality thereof, (d) removal of the silica $SiO_2$ by preferably filters, preferably mesh filters, more preferably surface filters, (e) purification of the silica to remove last traces of hydrogen chloride HCl in a dryer, preferably a rotating drum dryer, preferably with internals which preferably achieve combined radial and vertical motion, or preferably in a fluidized bed, or a moving bed, preferably with supply of gases such as air or nitrogen or inert gas, preferably at temperatures greater than 100° C., more preferably greater than 300° C., most preferably greater than 500° C., with a superficial gas velocity of 0.1-100 cm/s, preferably 1-10 cm/s, preference being given to measuring the traces of HCl analytically by a measurement of the pH, for example by suspending 4 g of silica in 100 ml of water, and (f) preferably homogenizing, for example, by mixing and fluidization in a silo of a particular defined amount of silica to a homogeneous batch, for example 1-20 to, preferably 5-15 to, (g) storage in silos and (h) optional compaction, for example with roll compacters, screw compacters, piston compacters, preferably roll compacters, (i) transfer to containers, for example to 5-20 kg sacks, to big bags of 50-500 kg, or to large containers such as silo trucks, silotainers of capacity 500-5000 kg.

Another configuration of the invention is an adjustable nozzle cross section. This can be done by means of shutters analogously to a photographic shutter, or by inserting diaphragms of variable size, which can be done by means of bodies positionable selectively, preferably cylindrical displacement bodies, as described, for example, in FIG. 1, which allow the effective and geometric cross section of the nozzle to be adjusted in a controlled manner.

Figure 1:
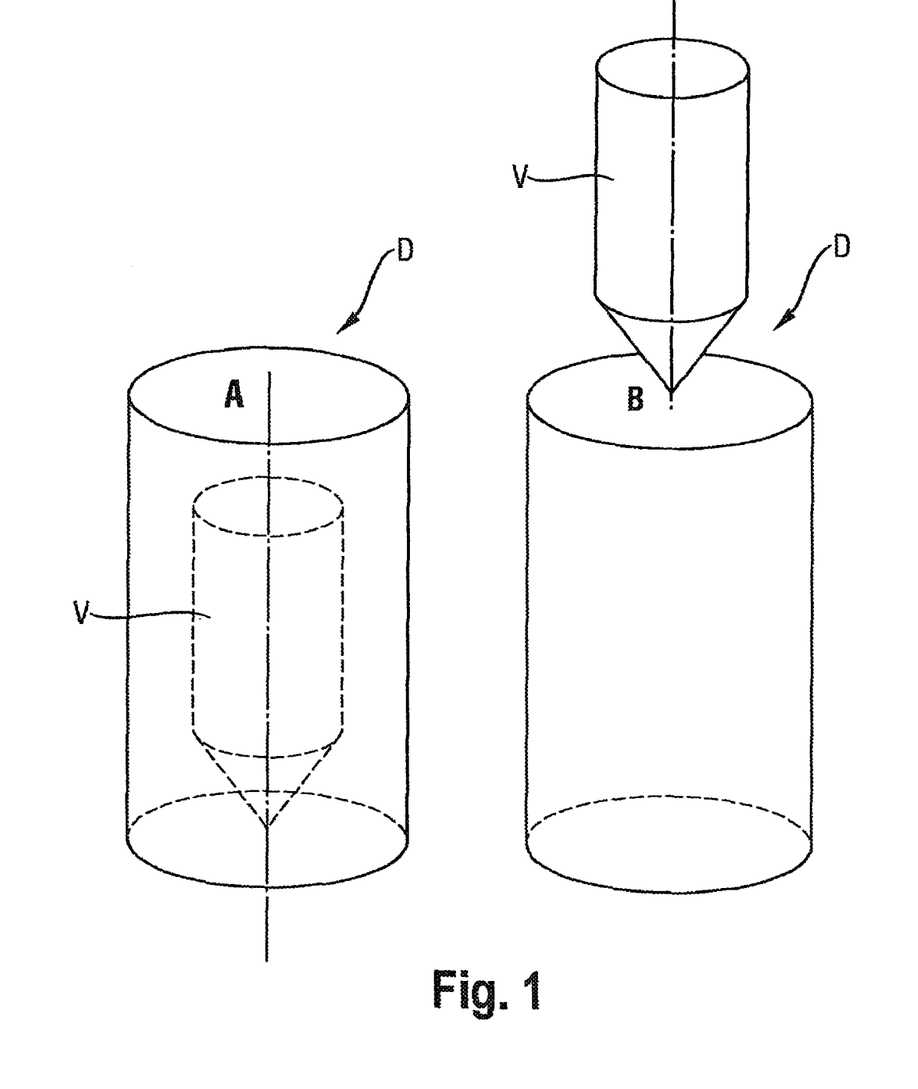
FIG. 1 illustrates one embodiment of an adjustable nozzle.

A further preferred embodiment is an apparatus for preparing fumed silica which has an apparatus for adjusting the cross section of the reactor nozzle, such as preferably a diaphragm or a displacement body, as described, for example, in FIG. 1.

FIG. 1

Example of an adjustable reactor nozzle D: Forward motion of a displacement body V in the axial direction of the reactor nozzle from position A, with low gas velocity at the nozzle, to position B, with high gas velocity at the nozzle, with equal absolute gas throughput, alters the gas velocity at the reactor nozzle with alteration of the cross section.

A preferred embodiment preferably has an inner nozzle with variable cross section which is surrounded on the outside in an annular manner by one further nozzle ring or a plurality thereof. Preferably, the particular orifices of the nozzles possess a ratio of their areas of inner nozzle to the outer nozzles of from 1 to x; x is preferably from 0.1 to 2, preferably from 0.5 to 1.5.

In a particularly preferred embodiment, the apparatus for preparing fumed silica has two or more reactor heads or nozzles which are arranged in the same reaction or reactor chamber; according to the load, one or more reactor heads may feed the reaction gases into the same reaction chamber.

Figure 2:
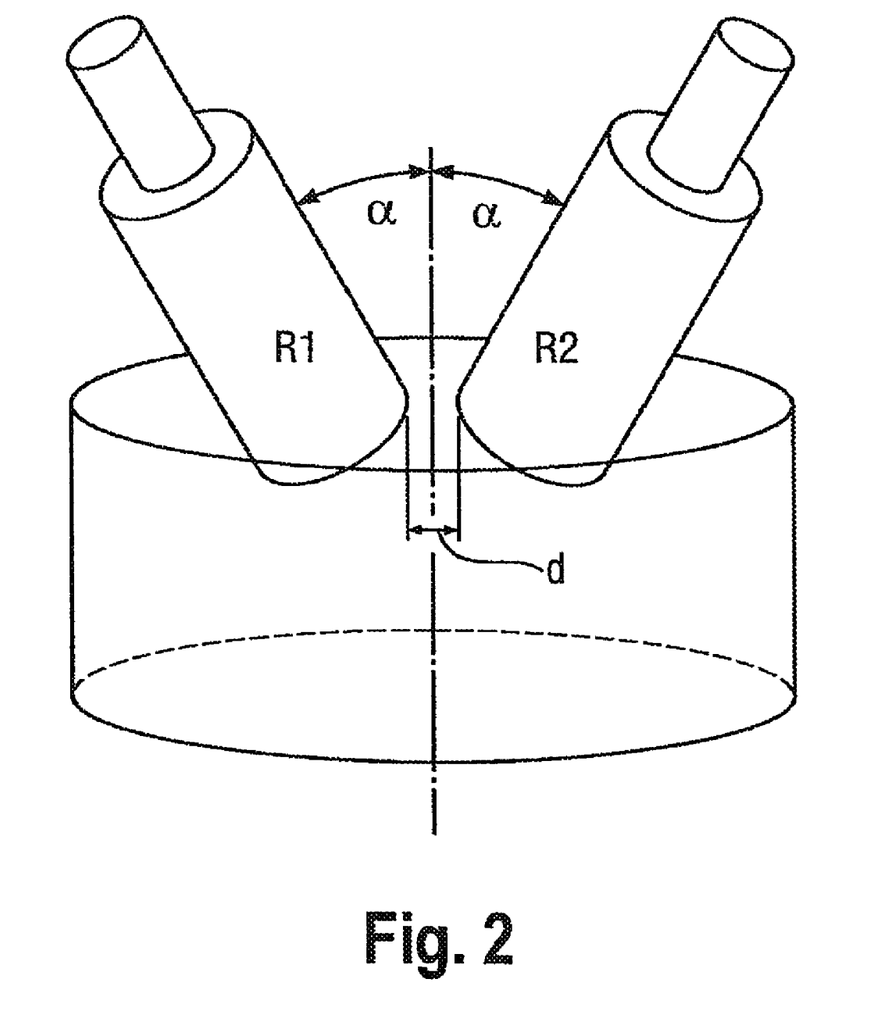
FIG. 2 illustrates one arrangement of two burner nozzles.

The two or more reactor heads which feed into the same reactor chamber may, in one embodiment, be heads or nozzles or nozzle systems which are arranged alongside one another, preferably in V form, as described, for example, in FIG. 2, preferably at a distance d of less than 1000 mm, preferably less than 100 mm, and at an angle $\phi=2$ times $\alpha$ between the two heads of preferably from 0° to 90°, preferably from 45° to 80°.

In a preferred embodiment, the inventive apparatus preferably has two reactor nozzles spaced apart, preferably in two adjacent upper reactor sections, preferably at the reactor head.

Preferably, the sum of the cross-sectional areas Q of the nozzles spaced apart, i.e. nozzle 1, nozzle 2, i.e.

$$Q=Q_1+Q_2+\ldots=\Sigma Q_n$$

i.e. the total exit area Q of the reactor nozzle, is from 0.001 $m^2$ to 0.1 $m^2$, more preferably from 0.002 to 0.05 $m^2$, most preferably from 0.008 $m^2$ to 0.03 $m^2$, in size.

Preference is given to first starting the reaction with one nozzle at the reactor head, then, with a stable reaction, starting the second rector head, then starting any further reactor heads.

FIG. 2

Example of two nozzles spaced apart in two upper reactor sections R1 and R2 spaced apart, at a distance d at the reactor head, and tilted with respect to one another at an angle of $\phi=2$ times $\alpha$.

Preferably, the nozzle may be surrounded by further feed devices for gases at the top of the combustion chamber; these feed devices can be used to introduce further amounts of air into the reaction chamber, preferably to stabilize the reaction zone, to cool the reaction zone externally, to separate reaction zone and wall, for flow-dynamic configurations and for control of the reaction zone.

The inner nozzle may preferably be surrounded in an annular manner by a second outer concentric nozzle; this outer nozzle can be used to introduce further amounts of air or reaction gases into the reaction chamber, preferably to stabilize the reaction zone, to cool the reaction zone externally, to separate reaction zone and wall, for flow-dynamic configurations and control of the reaction zone.

Preferably, the nozzle tip region is kept free of deposits during operation by blanketing with air or by flowing air over, for example preferably through bores from which air exits into the reactor chamber.

Preference is given to an apparatus for preparing fumed silica, which has, at at least one site other than the reactor nozzle in the reactor chamber, a feed apparatus for a combustion gas.

The invention further provides fumed silica which has a thickening action, described as the relative thickening $\eta/\eta 0$ in a silicone oil with optimal dispersion, of greater than 2.0, a mean sphere-equivalent hydrodynamic diameter in water at pH greater than 9 of from 150 to 300 nanometers, a boron content of less than 1 ppm, a titanium content of less than 1 ppm, an iron content of less than 1 ppm, an aluminum content of less than 10 ppm, a nickel content of less than 1 ppm and a copper content of less than 1 ppm.

The silica which is prepared by the process according to the invention is fumed silica which has specific surface area, preferably measured according to BET, of from 30 to 500 $m^2/g$, preferably from 70 to 330 $m^2/g$, more preferably from 80 to 230 $m^2/g$, more preferably from 80 to 170 $m^2/g$, and is a fumed silica which has a mean aggregate particle size, preferably measured as the sphere-equivalent hydrodynamic diameter, of from 100 to 500 nm, preferably from 150 to 350 nm, more preferably from 150 to 250 nm, preferably measured as the mean sphere-equivalent hydrodynamic diameter, preferably measured by photocorrelation spectroscopy or dynamic light scattering, for example with the Malvern Zetasizer® or Malvern Nanosizer® instrument, preferably in backscatter at an angle of from 170° to 180°, preferably approx. 173°, and preferably after dispersion at 0.3% by weight of water of pH 10, preferably established with ammonia, and preferably with dispersion with ultrasound, preferably an ultrasound tip, and is a fumed silica which has a relative thickening action $\eta/\eta 0$ of greater than 2.0, preferably greater than 4.0, more preferably greater than 6.0, most preferably greater than 7.5, based on an amount of 2% by weight of fumed silica in a silicone oil end-capped with trimethylsiloxy groups, preferably polydimethylsiloxane, with a viscosity of 1.0 Pas at a temperature of 25° C. at a shear rate of 10 l/s with optimal dispersion over 5 minutes with a toothed-disk dissolver at a rotational speed of approx. 11 m/s, and is a fumed silica which has a proportion of less than 0.03% by weight, preferably less than 0.015% by weight, more preferably less than 0.005% by weight, of coarse particles, preferably coarse particles of diameter greater than 10 µm, more preferably greater than 40 µm, based on the fumed silica, and is a fumed silica which contains fewer than 100,000 coarse particles, preferably fewer than 20,000 coarse particles, more preferably fewer than 10,000 coarse particles, most preferably fewer than 5000 coarse particles, particularly preferably fewer than 1000 coarse particles larger than 10 µm, more preferably larger than 1.5 µm, most preferably larger than 1.0 µm, most preferably larger than 0.56 µm, per 1 milliliter (ml or $cm^3$), preferably based on a from 1 to 50% by weight, more preferably on a 10% by weight, aqueous dispersion of the silica.

In addition, the fumed silica prepared in accordance with the invention preferably has a proportion of coarse sintered particles of less than 0.05% by weight, preferably less than 0.03% by weight, more preferably less than 0.015% by weight, most preferably less than 0.008% by weight. An example of a suitable test method is a gravimetric determination of the screen residue, for example according to Mocker (oversize >40 µm).

Preferably, the fumed silica prepared in accordance with the invention contains preferably less than 0.05% by weight, preferentially less than 0.03% by weight, more preferably less than 0.015% by weight, most preferably less than 0.008% by weight, of coarse sintered particles having a density of from 200 to 2500 g/l and having a diameter of from 0.5 to 500 µm. An example of a suitable test method is the use of an optical centrifuge, for example the LUMifuge® instrument.

Fumed silica prepared in accordance with the invention, and aqueous dispersion prepared therefrom, or chemical formulation based on such a dispersion, in which, after optimal dispersion, for example with a rotor-stator disperser at greater than 1000 revolutions per minute, preferably at greater than 10,000 revolutions per minute, more preferably greater than 25,000 revolutions per minute, and a dispersion time of greater than 1 minute, preferably greater than or equal to 5 minutes, and optimal stabilization, preferably alkaline stabilization, at pH 9-11, preferably pH 9.9-10.2, which, after removal of the fine pyrogenic silica, non-silica particles and coarse silica particles, such as coarse and/or dense sintered particles having a density of from 200 to 2500 g/l and having a diameter of from 0.5 to 500 µm, with commercial counting methods for determining large particles, for example based on light extinction processes, for example of white light or of laser light, fewer than 10,000 particles, preferably fewer than 2000 particles, more preferably fewer than 1000 particles, even more preferably fewer than 500 particles, exceptionally preferably fewer than 100 particles larger than 10 µm, more preferably larger than 1.5 µm, even more preferably larger than 1.0 µm, particularly preferably larger than 0.56 µm per ml, are present.

Fumed silica and non-silica particles and coarse particles can be removed by filtration, for example in a filtration in which the coarse particles remain on a separation or filter medium, and can thus be separated from the fumed silica and can thus be sent to visual or visual digital evaluation by microscopy. In another preferred embodiment, the fine fumed silica can also be removed by chemical dissolution and solubilization of the coarse particles. The fine colloidal fraction of the fumed silica can be dissolved by known chemicals which dissolve silicon dioxide, such as alkaline aqueous solutions, such as by addition of an alkali metal hydroxide, preferably potassium hydroxide, or alkaline earth metal hydroxides, to water. Other preferred chemicals are soluble alkali metal fluorides or alkaline earth metal fluorides, preferably in mixtures with mineral acids, for example hydrochloric acid, sulfuric acid or nitric acid, or hydrofluoric acid, or hydrofluoric acid in mixtures with mineral acids, for example sulfuric acid.

Aqueous dispersion of the fumed silica, or chemical formulation prepared therefrom, in which, after optimal dispersion, for example with a rotor-stator disperser at greater than 1000 revolutions per minute, preferably at greater than 10,000 revolutions per minute, preferably greater than 25,000 revolutions per minute, and a dispersion time of greater than 1 minute, preferably greater than or equal to 5 minutes, and optimal stabilization, preferably alkaline stabilization at pH 9-11, preferably pH 9.9 to 10.2, with conventional counting methods for determining large particles, for example based on light extinction methods, for example laser light or preferably white light extinction, fewer than 100,000 particles, preferably fewer than 20,000 particles, more preferably fewer than 10,000 particles, even more preferably fewer than 5000 particles, more preferably fewer than 1000 particles larger than 10 µm, more preferably larger than 1.5 µm, most preferably larger than 1.0 µm, particularly preferably larger than 0.56 µm per ml, are obtained.

The fumed silica preferably contains agglomerates and flakes with a density of from 10 to 200 g/l and with a diameter of from 1 to 500 µm.

The size of the silica agglomerates can preferably be measured by Fraunhofer light scattering on the silica in aqueous dispersion, or as a dry aerosol or powder, or by screening methods. Suitable instruments are supplied, for example, by Malvern®, Sympatec®, Coulter®, Zilas® or Horiba®.

Preferably, the fumed silica preferably exhibits low contamination with non-silicon dioxide constituents.

This can be assessed visually by an assessment of the screening residue according to Mocker (>40 µm), preferably with a magnifying glass, more preferably with a light microscope, which makes darkness, whiteness and colors visible down to >10 µm, preferably down to >1 µm, or, for example, by scanning electron microscopy or transmission electron microscopy, or by suspending silica in carbon tetrachloride, in which fumed silica or fumed silica dispersions appear to be transparent owing to the equal refractive index, thus making non-silicon dioxide fractions more clearly visible, for example making them visible even to the naked eye, but preferably with a magnifying glass or with a light microscope.

The inventive fumed silica, which has a specific surface area, preferably measured according to BET, of preferably from 30 to 500 $m^2/g$, preferably from 70 to 330 $m^2/g$, more preferably from 80 to 230 $m^2/g$, more preferably from 80 to 170 $m^2/g$, and a mean aggregate particle size, preferably measured as the sphere-equivalent hydrodynamic diameter, of from 100 to 500 nm, preferably from 150 to 350 nm, more preferably from 150 to 250 nm, and a relative thickening action $\eta/\eta 0$ of greater than 2.0, preferably greater than 4.0, more preferably greater than 6.0, most preferably greater than 7.5, and a proportion of less than 0.03% by weight, preferably less than 0.015% by weight, more preferably less than 0.008% by weight, of coarse particles, preferably coarse particles larger than 10 µm in diameter, more preferably larger than 40 µm, based on the fumed silica, and fewer than 100,000 coarse particles, preferably fewer than 20,000 coarse particles, more preferably fewer than 10,000 coarse particles, even more preferably fewer than 5000 coarse particles, particularly preferably fewer than 1000 coarse particles larger than 10 µm, more preferably larger than 1.5 µm, yet more preferably larger than 1.0 µm, most preferably larger than 0.56 µm per 1 milliliter (ml or $cm^3$), preferably based on a from 1 to 50% by weight, more preferably on a 10% by weight, aqueous dispersion of the silica.

Preferably, the relative thickening action $\eta/\eta 0$ of the fumed silica is preferably measured as the quotient of the viscosity $\eta$ of a liquid medium which comprises the fumed silica, measured at a temperature of 25° C., and of the viscosity $\eta 0$ of a liquid medium which contains no fumed silica, measured at a temperature of 25° C. Examples of liquid media are mixtures of a polyester resin, for example approx. 65% by weight, for example, of a condensation product of ortho-phthalic anhydride or maleic anhydride on the one hand, and of a diol, for example 1,2-propanediol, on the other hand, in a solvent, for example approx. 35% by weight, for example, of a reactive monomer, for example monostyrene, or silicone oils, for example preferably polydimethylsiloxane, preferably end-capped with trimethylsiloxy groups, preferably one with a viscosity at 25° C. of from 0.5 to 5.0 Pas, preferably 0.9-2.1 Pas, more preferably approx. 1.0 Pas. The amount of fumed silica in the liquid medium is preferably from 1 to 5% by weight, more preferably from 1.8 to 3.4% by weight, most preferably 2% by weight.

The viscosity is preferably measured at a temperature of 25° C. and at the same constant shear rate, preferably at a constant shear rate of from 0.5 to 200 l/s, more preferably at from 0.9 to 20 l/s, more preferably at 10 l/s.

The fumed silica is dispersed in the liquid medium preferably with optimal dispersion, for example with a toothed disk dissolver at a peripheral speed of from 4 to 20 m/s, preferably at 11 m/s, preferably over an optimal period, over from 3 to 10 minutes, more preferably over 5 minutes.

In another preferred embodiment, the surface-based relative thickening action $\eta/\eta 0$-BET of the fumed silica is from 4.0 to 8.0, preferably from 5.5 to 7.0, using a BET surface area-based relative starting weight of the silica of twice f% by weight, where f=(200 m²/g)/BET silica, where BET silica is the specific surface area of the silica measured according to BET.

The mean aggregate particle size is preferably measured as the mean sphere-equivalent hydrodynamic diameter, preferably measured by photocorrelation spectroscopy or dynamic light scattering or quasi-elastic light scattering, at an angle of from 1 to 179°, preferably at approx. 90°, or, in another preferred embodiment, in backscatter at an angle of from 170° to 179°, preferably at approx. 173°, for example with the Malvern Zetasizer® or Malvern Nanosizer® instrument, and readout of the Z-average value by a cumulant analysis or the standard algorithm, as the mean aggregate diameter and preferably after dispersion at 0.3% by weight in water of pH 10, preferably adjusted with ammonia, and preferably with dispersion with a magnetic stirrer, preferably at from 100 to 500 revolutions per minute, more preferably at 300 revolutions per minute, and with ultrasound, preferably an ultrasound tip at 75-95% power, more preferably at 90% power, for example a Bandelin UM60 ultrasound tip, over from 1 to 15 minutes, preferably from 5 to 10 minutes, more preferably 5 min., at a temperature of 25° C.

The proportion of coarse particles, for example sintered particles, is preferably determined gravimetrically. An example of a suitable test method here is a gravimetric determination of the screen residue after screening of the silica slurried with water with screens of mesh sizes less than 100 μm, preferably less than 40 μm, more preferably less than 10 μm. A particularly preferred example of this is the Mocker method, for example by means of a water jet and a 40 μm screen (oversize >40 μm).

The proportion of coarse particles is preferably determined as coarse sintered particles having a density of from 200 to 2500 g/l and having a diameter of from 0.5 to 500 μm. An example of a suitable analysis method is the use of an optical centrifuge, for example the LUMifuge® instrument.

Preferably, the proportion of coarse particles in the fumed silica prepared by the process according to the invention is measured on an aqueous dispersion, or chemical formulation based on such a dispersion which has been prepared from the silica, in which, after optimal dispersion, for example with a rotor-stator disperser at greater than 1000 revolutions per minute, preferably at greater than 10,000 revolutions per minute, more preferably greater than 25,000 revolutions per minute, and a dispersion time of greater than 1 minute, preferably greater than or equal to 5 minutes, and optimal stabilization, for example alkaline stabilization at pH 9-11, preferably pH 9.9 to 10.2, by commercial counting methods for determining large particles, for example based on light extinction processes, for example white light or laser light, for example with an Accusizer® 680 or 780 instrument, or a Liquilaz® instrument from PSM, Oregon, USA, or an FAS® instrument from Topas, Germany.

In another preferred embodiment, the proportion of coarse particles in the fumed silica prepared by the process according to the invention is measured on an aqueous dispersion, or chemical formulation based on such a dispersion which has been prepared from the silica, in which, after optimal dispersion, for example with a rotor-stator disperser at greater than 1000 revolutions per minute, preferably at greater than 10,000 revolutions per minute, more preferably greater than 25,000 revolutions per minute, and a dispersion time of greater than 1 minute, preferably greater than or equal to 5 minutes, and optimal stabilization, for example alkaline stabilization at pH 9-11, preferably pH 9.9 to 10.2, and after removal of the fine fumed silica, as non-silica particles and coarse silica particles, such as coarse and/or dense sintered particles with a density of from 200 to 2500 g/l and with a diameter of from 0.5 to 500 μm, by commercial counting methods for determining large particles, for example based on light extinction processes, for example white light or laser light, for example with an Accusizer® 680 or 780 instrument, or a Liquilaz® instrument from PSM, Oregon, USA, or an FAS® instrument from Topas, Germany.

Preferably, the fumed silica prepared by the process according to the invention then comprises, after the above-described removal of the fine fumed silica, in an aqueous dispersion, fewer than 10 000 coarse particles, preferably fewer than 2000 coarse particles, more preferably fewer than 1000 coarse particles, even more preferably fewer than 500 coarse particles, exceptionally preferably fewer than 100 coarse particles, which are larger than 10 μm, more preferably larger than 1.5 μm, even more preferably larger than 1.0 μm, particularly preferably larger than 0.56 μm, per ml.

Fumed silica and non-silica particles and coarse particles can be removed by filtration, for example in a filtration in which the coarse particles remain on a separation or filter medium and can thus be separated from the fumed silica, and can thus be sent to visual or visual digital evaluation by microscopy. In another preferred embodiment, the fine fumed silica can also be removed from the coarse particles by chemical dissolution and solubilization. The fine colloidal fraction of the fumed silica can be dissolved by known chemicals which dissolve silicon dioxide, such as alkaline aqueous solutions as obtained by adding alkali metal hydroxide, preferably potassium hydroxide, or alkaline earth metal hydroxides, to water. Other preferred chemicals are soluble alkali metal fluorides or alkaline earth metal fluorides, preferably in mixtures with mineral acids, for example hydrochloric acid, sulfuric acid or nitric acid, or hydrofluoric acid, or hydrofluoric acid in mixtures with mineral acids, for example sulfuric acid.

Preferably, the fumed silica preferably has a content of non-silicon elements of less than 1% by weight, preferentially less than 0.1% by weight, more preferably less than 0.01% by weight, most preferably less than 10 ppm by weight, particularly preferably less than 1 ppm by weight, based on the overall silica.

In addition, the silica prepared in accordance with the invention has an aluminum content of less than 10 ppm by weight, preferably less than 1 ppm of aluminum, a boron content of less than 10 ppm by weight, preferably less than 1 ppm of boron, a titanium content of less than 1 ppm by weight, preferably less than 200 ppb of titanium, and an iron, cobalt, nickel and copper content of less than 1 ppm by weight, preferably iron, cobalt, nickel and copper less than 200 ppb.

Non-silicon elements are preferably detected qualitatively and semiquantitatively by means of spectral analysis after fuming silicon dioxide with hydrofluoric acid, or analyzed quantitatively by means of inductively coupled plasma and optical emission analysis or mass spectrometry.

The silica prepared preferably has a primary particle diameter d or Sauter diameter d calculated from the specific surface area SA, measured according to BET, and the material density ρ of 2200 g/l, according to d=6/(ρ*SA), of 5-100 nm, a specific surface area measured according to BET of 30-500 m²/g, and a hydrodynamic diameter of the aggregates which are formed from primary particles and are preferably sintered stably of 100-500 nm, by dynamic light scattering or photocorrelation spectroscopy or inelastic light scattering, measured in suspension in a liquid with viscosity <5 mPas in pure form, such as aqueous suspensions in water or alcoholic suspensions, or an aerodynamic diameter of 100-1000 nm, measured in air or gas, or a diameter measured via rheology of greater than 100 nm, a geometric diameter of the agglomerates formed from aggregates, measured by Fraunhofer light diffraction, in fluids such as water or alcohol or oils, of from 500 nm to 100 μm, and measured in air or gases from 1 μm to 1 mm.

The silica prepared preferably has a fractal dimension of the surface area of less than 3, preferably from 1.9 to 2.7, more preferably of 2.0-2.1.

The silica prepared preferably has a fractal dimension of the material of less than 3, preferably from 1.5 to 2.8, more preferably of 1.8-2.3, particularly preferably of 1.9-2.1.

The silica prepared preferably has a content of surface silanol groups SiOH of 1.5-2.0, preferably of 1.7-1.9, SiOH per $nm^2$ of specific surface area measured according to BET, measured as acidic SiOH by means of a titration method based on the methods of Sears.

The silica preferably does not contain any chlorinated polyaromatic hydrocarbons, especially none which contains oxygen atoms.

In particular, the content of chlorinated aromatic dioxins and furans is less than 1 ppb by weight.

The inventive fumed silica prepared by the process according to the invention is used as a thickener, rheology additive, thixotropic agent, reinforcing filler for elastomers, plastomers and thermosets, for example in surface coatings, paints and inks, adhesives, sealants, glass fiber-reinforced plastics, composite materials, rubbers and other plastics, as abrasive particles in chemomechanical planarization in the semiconductor industry, as a polish, as a thermal insulator, for producing print media, as a flow aid, for producing layers and moldings which may be impervious or porous, as an additive and filler for paints, coatings, inks, adhesives and sealants and rubbers, composed of silicones or synthetic or natural rubber, for example for tires and shoe soles.

The inventive fumed silica prepared by the process according to the invention is used as a matting agent in paints and coatings, and for adhesive and sealant systems.

At the same time, it has been found that, surprisingly, these inventive plants can achieve larger and more stable three-dimensional structures of the fumed silica particles, i.e. more stable aggregates and sintering of the silica arise, and thus an improvement in the property as a rheological additive, as a reinforcing filler for elastomers, plastomers and resins, as a thermal insulation base material, as a coating material for printing media is achieved.

The silica is preferably used in the process of chemomechanical polishing in optics, in the semiconductor industry, in the electrical engineering and in the electronics industry, and in the surface treatment of metals, ceramics and glasses, as an abrasive or polish.

The invention further provides a molding, coating or impregnation which comprises the inventive silica.

The silica is preferably used in coating materials, surface layers, textiles, polymeric adhesives, sealants, rubbers and composite materials, and in coating materials, adhesives, sealants, rubbers and composite materials to control the rheology or the mechanical properties, or to control rheology and reinforcement.

The invention further provides a powder or toner which comprises the inventive silica.

The silica is preferably used in powders, in toners, in electrophotography, in firefighting powders, in firefighting powders to control the dry free flow or the electrical charge, or to control the dry free flow and the electrical charge.

EXAMPLES

Example 1

A premixed gas mixture which exits from a nozzle with a gas velocity of 60 m/s and enters a burner chamber via a nozzle at the top of a combustion chamber, the combustion chamber having a gauge pressure of less than 50 mbar relative to the current outside pressure, and the gas mixture having a temperature between 100° C. and 200° C., is reacted in the combustion chamber at from 1000° C. to 2000° C., the reactions in the combustion chamber involving 6% by volume of silane with a tetrachlorosilane content of greater than 90% by volume, 74% by volume of air from the environment, the air being fed in to an extent of 82% by volume from the nozzle and to an extent of 18% by volume from further feed devices outside the nozzle at the top of the combustion chamber, and 20% by volume of combustion gas, the combustion gas containing greater than 90% by volume of hydrogen gas. After evacuation of the combustion chamber, cooling to less than 200° C., removal of the hydrogen chloride gas formed from the fumed silica formed through mesh filters, recovery of dry hydrogen chloride gas in a multistage absorption and desorption process, reduction of the excess chlorine gas, and offgas cleaning, and purification of the fumed silica in a fluidized bed by means of hot gases at from 400 to 800° C., a fumed silica is obtained with a specific BET surface area of 50 $m^2$/g, with a tapped density after bagging in a 10 kg paper sack of 53 g/l, with a pH of a 4% by weight dispersion of 4.3, a >40 μm screen residue according to Mocker of 0.008% by weight, a thickening action η/η0 in a silicone oil of 2.2, a mean sphere-equivalent hydrodynamic particle size of 300 nm, measured after ultrasound dispersion, at a concentration of 0.3% by weight, a temperature of 25° C., at pH 10, and measured with a Malvern Zetasizer Nano ZS® at a backscatter angle of 173°.

Example 2

A premixed gas mixture which enters a burner chamber via a nozzle at the top of a combustion chamber from a nozzle with a gas velocity of 69 m/s, the combustion chamber having a gauge pressure of less than 50 mbar relative to the current outside pressure, and the gas mixture at a temperature between 100° C. and 200° C., is reacted in the combustion chamber at from 1000° C. to 2000° C., the reactions in the combustion chamber involving 7% by volume of silane with a tetrachlorosilane content of greater than 90% by volume, 74% by volume of air from the environment, the air being fed in to an extent of 74% by volume from the nozzle and to an extent of 26% by volume from further feed devices outside the nozzle at the top of the combustion chamber, and 19% by volume of combustion gas, the combustion gas containing greater than 90% by volume of hydrogen gas. After evacuation of the combustion chamber, cooling to less than 200° C., removal of the hydrogen chloride gas formed from the fumed silica formed through mesh filters, recovery of dry hydrogen chloride gas in a multistage absorption and desorption process, reduction of the excess chlorine gas, and offgas cleaning, and purification of the fumed silica in a fluidized bed by means of hot gases at from 400 to 800° C., a fumed silica is obtained with a specific BET surface area of 100 $m^2$/g, with a tapped density after bagging in a 10 kg paper sack of 46 g/l, with a pH of a 4% by weight dispersion of 4.2, a >40 μm screen residue according to Mocker of 0.005% by weight, a thickening action η/η0 in a silicone oil of 2.5, a mean sphere-equivalent hydrodynamic particle size of 235 nm after ultrasound dispersion at 0.3% by weight, a temperature of 25° C. and at pH 10, and measured with a Malvern Zetasizer Nano ZS® at a backscatter angle of 173°.

Example 3

A premixed gas mixture which enters a burner chamber via a nozzle at the top of a combustion chamber from a nozzle with a gas velocity of 60 m/s, the combustion chamber having a gauge pressure of less than 50 mbar relative to the current outside pressure, and the gas mixture having a temperature between 100° C. and 200° C., is reacted in the combustion chamber at from 1000° C. to 2000° C., the reactions in the combustion chamber involving 9% by volume of silane with a tetrachlorosilane content of greater than 90% by volume, 75% by volume of air from the environment, the air being fed in to an extent of 67% by volume from the nozzle and to an extent of 33% by volume from further feed devices outside the nozzle at the top of the combustion chamber, and 17% by volume of combustion gas, the combustion gas containing greater than 90% by volume of hydrogen gas. After evacuation of the combustion chamber, cooling to less than 200° C., removal of the hydrogen chloride gas formed from the fumed silica formed through mesh filters, recovery of dry hydrogen chloride gas in a multistage absorption and desorption process, reduction of the excess chlorine gas, and offgas cleaning, and purification of the fumed silica in a fluidized bed by means of hot gases at from 400 to 800° C., a fumed silica is obtained with a specific BET surface area of 125 m$^2$/g, with a tapped density after bagging in a 10 kg paper sack of 45 g/l, with a pH of a 4% by weight dispersion of 4.2, a >40 μm screen residue according to Mocker of 0.003% by weight, a thickening action $\eta/\eta 0$ in a silicone oil of 3.1, a mean sphere-equivalent hydrodynamic particle size of 230 nm after ultrasound dispersion at 0.3% by weight, a temperature of 25° C. and at pH 10, and measured with a Malvern Zetasizer Nano ZS® at a backscatter angle of 173°.

Example 4

A premixed gas mixture which enters a burner chamber via a nozzle at the top of a combustion chamber from a nozzle with a gas velocity of 58 m/s, the combustion chamber having a gauge pressure of less than 50 mbar relative to the current outside pressure, and the gas mixture having a temperature between 100° C. and 200° C., is reacted in the combustion chamber at from 1000° C. to 2000° C., the reactions in the combustion chamber involving 9% by volume of silane with a tetrachlorosilane content of greater than 90% by volume, 74% by volume of air from the environment, the air being fed in to an extent of 70% by volume from the nozzle and to an extent of 30% by volume from further feed devices outside the nozzle at the top of the combustion chamber, and 17% by volume of combustion gas, the combustion gas containing greater than 90% by volume of hydrogen gas. After evacuation of the combustion chamber, cooling to less than 200° C., removal of the hydrogen chloride gas formed from the fumed silica formed through mesh filters, recovery of dry hydrogen chloride gas in a multistage absorption and desorption process, reduction of the excess chlorine gas, and offgas cleaning, and purification of the fumed silica in a fluidized bed by means of hot gases at from 400 to 800° C., a fumed silica is obtained with a specific BET surface area of 150 m$^2$/g, with a tapped density after bagging in a 10 kg paper sack of 43 g/l, with a pH of a 4% by weight dispersion of 4.2, a >40 μm screen residue according to Mocker of 0.003% by weight, a thickening action $\eta/\eta 0$ in a silicone oil of 3.5, a mean sphere-equivalent hydrodynamic particle size of 220 nm after ultrasound dispersion at 0.3% by weight, a temperature of 25° C. and at pH 10, and measured with a Malvern Zetasizer Nano ZS® at a backscatter angle of 173°.

Example 5

A premixed gas mixture which enters a burner chamber via a nozzle at the top of a combustion chamber from a nozzle with a gas velocity of 60 m/s, the combustion chamber having a gauge pressure of less than 50 mbar relative to the current outside pressure, and the gas mixture having a temperature between 100° C. and 200° C., is reacted in the combustion chamber at from 1000° C. to 2000° C., the reactions in the combustion chamber involving 9% by volume of silane with a tetrachlorosilane content of greater than 90% by volume, 72% by volume of air from the environment, the air being fed in to an extent of 88% by volume from the nozzle and to an extent of 12% by volume from further feed devices outside the nozzle at the top of the combustion chamber, and 18% by volume of combustion gas, the combustion gas containing greater than 90% by volume of hydrogen gas. After evacuation of the combustion chamber, cooling to less than 200° C., removal of the hydrogen chloride gas formed from the fumed silica formed through mesh filters, recovery of dry hydrogen chloride gas in a multistage absorption and desorption process, reduction of the excess chlorine gas, and offgas cleaning, and purification of the fumed silica in a fluidized bed by means of hot gases at from 400 to 800° C., a fumed silica is obtained with a specific BET surface area of 200 m$^2$/g, with a tapped density after bagging in a 10 kg paper sack of 42 g/l, with a pH of a 4% by weight dispersion of 4.1, a >40 μm screen residue according to Mocker of 0.003% by weight, a thickening action $\eta/\eta 0$ in a silicone oil of 6.0, a mean sphere-equivalent hydrodynamic particle size of 200 nm after ultrasound dispersion at 0.3% by weight, a temperature of 25° C. and at pH 10, and measured with a Malvern Zetasizer Nano ZS® at a backscatter angle of 173°.

Example 6

A premixed gas mixture which enters a burner chamber via a nozzle at the top of a combustion chamber from a nozzle with a gas velocity of 77 m/s, the combustion chamber having a gauge pressure of less than 50 mbar relative to the current outside pressure, and the gas mixture having a temperature between 100° C. and 200° C., is reacted in the combustion chamber at from 1000° C. to 2000° C., the reactions in the combustion chamber involving 7% by volume of silane with a tetrachlorosilane content of greater than 90% by volume, 77% by volume of air from the environment, the air being fed in to an extent of 87% by volume from the nozzle and to an extent of 13% by volume from further feed devices outside the nozzle at the top of the combustion chamber, and 16% by volume of combustion gas, the combustion gas containing greater than 90% by volume of hydrogen gas. After evacuation of the combustion chamber, cooling to less than 200° C., removal of the hydrogen chloride gas formed from the fumed silica formed through mesh filters, recovery of dry hydrogen chloride gas in a multistage absorption and desorption process, reduction of the excess chlorine gas, and offgas cleaning, and purification of the fumed silica in a fluidized bed by means of hot gases at from 400 to 800° C., a fumed silica is obtained with a specific BET surface area of 300 m$^2$/g, with a tapped density after bagging in a 10 kg paper sack of 38 g/l, with a pH of a 4% by weight dispersion of 4.0, a >40 μm screen residue according to Mocker of 0.003% by weight, a thickening action $\eta/\eta 0$ in a silicone oil of 6.8, a mean sphere-equivalent hydrodynamic particle size of 166 nm after ultrasound dispersion at 0.3% by weight, a temperature of 25° C. and at pH 10, and measured with a Malvern Zetasizer Nano ZS® at a backscatter angle of 173°.

Example 7

A premixed gas mixture which enters a burner chamber via a nozzle at the top of a combustion chamber from a nozzle with a gas velocity of 67 m/s, the combustion chamber having a gauge pressure of less than 50 mbar relative to the current outside pressure, and the gas mixture having a temperature between 100° C. and 200° C., is reacted in the combustion chamber at from 1000° C. to 2000° C., the reactions in the combustion chamber involving 7% by volume of silane with a tetrachlorosilane content of greater than 90% by volume, 77% by volume of air from the environment, the air being fed in to an extent of 94% by volume from the nozzle and to an extent of 6% by volume from further feed devices outside the nozzle at the top of the combustion chamber, and 16% by volume of combustion gas, the combustion gas containing greater than 90% by volume of hydrogen gas. After evacuation of the combustion chamber, cooling to less than 200° C., removal of the hydrogen chloride gas formed from the fumed silica formed through mesh filters, recovery of dry hydrogen chloride gas in a multistage absorption and desorption process, reduction of the excess chlorine gas, and offgas cleaning, and purification of the fumed silica in a fluidized bed by means of hot gases at from 400 to 800° C., a fumed silica is obtained with a specific BET surface area of 400 m$^2$/g, with a tapped density after bagging in a 10 kg paper sack of 35 g/l, with a pH of a 4% by weight dispersion of 4.0, a >40 μm screen residue according to Mocker of 0.002% by weight, a thickening action $\eta/\eta 0$ in a silicone oil of 6.3, a mean sphere-equivalent hydrodynamic particle size of 157 nm after ultrasound dispersion at 0.3% by weight, a temperature of 25° C. and at pH 10, and measured with a Malvern Zetasizer Nano ZS® at a backscatter angle of 173°.

Example 8

A premixed gas mixture which enters a burner chamber via a nozzle at the top of a combustion chamber from a nozzle with a gas velocity of 73 m/s, the combustion chamber having a gauge pressure of less than 50 mbar relative to the current outside pressure, and the gas mixture having a temperature between 100° C. and 200° C., is reacted in the combustion chamber at from 1000° C. to 2000° C., the reactions in the combustion chamber involving 6% by volume of silane with a methyl trichlorosilane content of greater than 90% by volume, 88% by volume of air from the environment, the air being fed in to an extent of 94% by volume from the nozzle and to an extent of 6% by volume from further feed devices outside the nozzle at the top of the combustion chamber, and 5% by volume of combustion gas, the combustion gas containing greater than 90% by volume of hydrogen gas. After evacuation of the combustion chamber, cooling to less than 200° C., removal of the hydrogen chloride gas formed from the fumed silica formed through mesh filters, recovery of dry hydrogen chloride gas in a multistage absorption and desorption process, reduction of the excess chlorine gas, and offgas cleaning, and purification of the fumed silica in a fluidized bed by means of hot gases at from 400 to 800° C., a fumed silica is obtained with a specific BET surface area of 150 m$^2$/g, with a tapped density after bagging in a 10 kg paper sack of 40 g/l, with a pH of a 4% by weight dispersion of 4.1, a >40 μm screen residue according to Mocker of 0.005% by weight, a thickening action $\eta/\eta 0$ in a silicone oil of 4.0, a mean sphere-equivalent hydrodynamic particle size of 220 nm after ultrasound dispersion at 0.3% by weight, a temperature of 25° C. and at pH 10, and measured with a Malvern Zetasizer Nano ZS® at a backscatter angle of 173°.

Example 9

A premixed gas mixture which enters a burner chamber via a nozzle at the top of a combustion chamber from a nozzle with a gas velocity of 101 m/s, the combustion chamber having a gauge pressure of less than 50 mbar relative to the current outside pressure, and the gas mixture having a temperature between 100° C. and 200° C., is reacted in the combustion chamber at from 1000° C. to 2000° C., the reactions in the combustion chamber involving 4% by volume of silane with a methyl trichlorosilane content of greater than 90% by volume, 88% by volume of air from the environment, the air being fed in to an extent of 96% by volume from the nozzle and to an extent of 4% by volume from further feed devices outside the nozzle at the top of the combustion chamber, and 8% by volume of combustion gas, the combustion gas containing greater than 90% by volume of hydrogen gas. After evacuation of the combustion chamber, cooling to less than 200° C., removal of the hydrogen chloride gas formed from the fumed silica formed through mesh filters, recovery of dry hydrogen chloride gas in a multistage absorption and desorption process, reduction of the excess chlorine gas, and offgas cleaning, and purification of the fumed silica in a fluidized bed by means of hot gases at from 400 to 800° C., a fumed silica is obtained with a specific BET surface area of 200 m$^2$/g, with a tapped density after bagging in a 10 kg paper sack of 40 g/l, with a pH of a 4% by weight dispersion of 4.1, a >40 μm screen residue according to Mocker of 0.005% by weight, a thickening action $\eta/\eta 0$ in a silicone oil of 6.5, a mean sphere-equivalent hydrodynamic particle size of 200 nm after ultrasound dispersion at 0.3% by weight, a temperature of 25° C. and at pH 10, and measured with a Malvern Zetasizer Nano ZS® at a backscatter angle of 173°.

Example 10

A premixed gas mixture which enters a burner chamber via a nozzle at the top of a combustion chamber from a nozzle with a gas velocity of 54 m/s, corresponding to an output of 10 300 tonnes in 8760 hours, the combustion chamber having a gauge pressure of less than 50 mbar relative to the current outside pressure, and the gas mixture having a temperature between 100° C. and 200° C., is reacted in the combustion chamber at from 1000° C. to 2000° C., the reactions in the combustion chamber involving 10% by volume of silane with a tetrachlorosilane content of greater than 20% by volume and a hydrogen trichlorosilane content of 80% by volume, 78% by volume of air from the environment, the air being fed in to an extent of 90% by volume from the nozzle and to an extent of 10% by volume from further feed devices outside the nozzle at the top of the combustion chamber, and 12% by volume of combustion gas, the combustion gas containing greater than 90% by volume of hydrogen gas. After evacuation of the combustion chamber, cooling to less than 200° C., removal of the hydrogen chloride gas formed from the fumed silica formed through mesh filters, recovery of dry hydrogen chloride gas in a multistage absorption and desorption process, reduction of the excess chlorine gas, and offgas cleaning, and purification of the fumed silica in a fluidized bed by means of hot gases at from 400 to 800° C., a fumed silica is obtained with a specific BET surface area of 200 m$^2$/g, with a tapped density after bagging in a 10 kg paper sack of 41 g/l, with a pH of a 4% by weight dispersion of 4.1, a >40 μm screen residue according to Mocker of 0.003% by weight, a thickening action η/η0 in a silicone oil of 6.5, a mean sphere-equivalent hydrodynamic particle size of 200 nm after ultrasound dispersion at 0.3% by weight, a temperature of 25° C. and at pH 10, and measured with a Malvern Zetasizer Nano ZS® at a backscatter angle of 173°.

Example 11

A premixed gas mixture which enters a burner chamber via a nozzle at the top of a combustion chamber from a nozzle with a gas velocity of 47 m/s, the combustion chamber having a gauge pressure of less than 50 mbar relative to the current outside pressure, and the gas mixture having a temperature between 100° C. and 200° C., is reacted in the combustion chamber at from 1000° C. to 2000° C., the reactions in the combustion chamber involving 10% by volume of silane with a tetrachlorosilane content of greater than 20% by volume and a hydrogen trichlorosilane content of 45% by volume and a methyl trichlorosilane content of 35% by volume, 78% by volume of air from the environment, the air being fed in to an extent of 90% by volume from the nozzle and to an extent of 10% by volume from further feed devices outside the nozzle at the top of the combustion chamber, and 12% by volume of combustion gas, the combustion gas containing greater than 90% by volume of hydrogen gas. After evacuation of the combustion chamber, cooling to less than 200° C., removal of the hydrogen chloride gas formed from the fumed silica formed through mesh filters, recovery of dry hydrogen chloride gas in a multistage absorption and desorption process, reduction of the excess chlorine gas, and offgas cleaning, and purification of the fumed silica in a fluidized bed by means of hot gases at from 400 to 800° C., a fumed silica is obtained with a specific BET surface area of 200 m$^2$/g, with a tapped density after bagging in a 10 kg paper sack of 41 g/l, with a pH of a 4% by weight dispersion of 4.2, a >40 μm screen residue according to Mocker of 0.007% by weight, a thickening action η/η0 in a silicone oil of 6.4, a mean sphere-equivalent hydrodynamic particle size of 198 nm after ultrasound dispersion at 0.3% by weight, a temperature of 25° C. and at pH 10, and measured with a Malvern Zetasizer Nano ZS® at a backscatter angle of 173°.

Example 12

The procedure is as in example 5. Over an annual run time totaling 7884 hours, 10,000 tonnes of fumed silica are obtained with a specific BET surface area of 200 m$^2$/g, with a tapped density after bagging in a 10 kg paper sack of 42 g/l, with a pH of a 4% by weight dispersion of 4.1, a >40 μm screen residue according to Mocker of 0.003% by weight, a thickening action η/η0 in a silicone oil of 6.0, a mean sphere-equivalent hydrodynamic particle size of 200 nm after ultrasound dispersion at 0.3% by weight, a temperature of 25° C. and at pH 10. The BET surface area measured on 100 different samples from these 10,000 tonnes obeys a normal distribution with a mean of 200 m$^2$/g and a standard deviation SIGMA of 7.5 m$^2$/g. The mean particle size measured on 100 samples from these 10,000 tonnes obeys a normal distribution with a mean of 200 nm and a standard deviation SIGMA of 1.5 nm.

Example 13

The procedure is as in example 9. Over 8760 hours, 7000 tonnes of fumed silica are obtained with a specific BET surface area of approx. 200 m$^2$/g, with a tapped density after bagging in a 10 kg paper sack of approx. 40 g/l, with a pH of a 4% by weight dispersion of approx. 4.1, a >40 μm screen residue according to Mocker of approx. 0.005% by weight, a thickening action η/η0 in a silicone oil of approx. 6.5, a mean sphere-equivalent hydrodynamic particle size of approx. 193 nm after ultrasound dispersion at 0.3% by weight, a temperature of 25° C. and at pH 10. The BET surface area measured on 100 different samples from these 7000 to obeys a normal distribution with a mean of 200 m$^2$/g and a standard deviation SIGMA of 7.5 m$^2$/g. The mean particle size measured on 100 samples from these 7000 tonnes obeys a normal distribution with a mean of 215 nm and a standard deviation SIGMA of 1.5 nm.

Example 14

The procedure is as in example 11. Over 8760 hours, 10,800 tonnes of fumed silica are obtained with a specific BET surface area of 200 m$^2$/g, with a tapped density after bagging in a 10 kg paper sack of 41 g/l, with a pH of a 4% by weight dispersion of 4.2, a >40 μm screen residue according to Mocker of 0.007% by weight, a thickening action η/η0 in a silicone oil of 6.5, a mean sphere-equivalent hydrodynamic particle size of 210 nm after ultrasound dispersion at 0.3% by weight, a temperature of 25° C. and at pH 10. The BET surface area measured on 100 different samples from these 10,800 tonnes obeys a normal distribution with a mean of 192 m$^2$/g and a standard deviation SIGMA of 7.5 m$^2$/g. The mean particle size measured on 100 samples from these 10,800 tonnes obeys a normal distribution with a mean of 215 nm and a standard deviation SIGMA of 1.5 nm.

Test Methods:
Specific BET surface area: to DIN 9277/66132
pH: to EN ISO 787/9
Screen residue according to Mocker (greater than 40 μm): to EN ISO 787/18
Tapped density: to EN ISO 787/11
Moisture (weight loss at 2 hours and 105° C.): to EN ISO 787/2
Definition of m$^3$ (STP)/h:
m$^3$ (STP)/h is the volume of gas or steam delivered per 1 hour
Definition of m$^3$ (STP)
The standard cubic meter (abbreviation: m$^3$ (STP)) is a unit often used in process technology for the standard volume of a gas.
The definition of the standard cubic meter is laid down in DIN 1343 and in ISO 2533.
A standard cubic meter is the amount which corresponds to one cubic meter of gas at a pressure of 1.01325 bar, an air humidity of 0% (dry gas) and a temperature of 0° C. (DIN 1343) or 15° C. (ISO 2533).
This means that one standard cubic meter of gas has a volume of 1 m$^3$ under the fixed conditions, but generally another volume which can be determined by specific calculations under different conditions.
In the compressed air industry, different values according to DIN 1945 apply. Here, the standard volume is reported for a pressure of 1 bar, a temperature of 20° C. at 0% air humidity.
Definition of cpk or CpK value
Processibility index (CpK)
The Cpk value is an index for assessing the performance of a process (see: processibility). It states how often the aims set (according to the specification) are achieved and how frequently this happens.

The CpK is defined as (mean value minus lower specification limit) or (upper specification limits minus mean value)—the smaller value in each case—divided by three times the standard deviation. The higher this value is, the more reliably the overall production is within the specification.

While the Cp value reports only the ratio of process control with respect to the preset tolerance, the Cpk value also includes the position of the mean with respect to the median of the preset tolerance. The Cpk is therefore usually smaller than the Cp.

The Cp is calculated by the formula: upper specification limit minus lower specification limit divided by six times the standard deviation.

The invention claimed is:

1. A process for preparing fumed silica in a reactor having a combustion zone, the fumed silica having a specific surface area from 30 to 500 m$^2$/g, a mean aggregate particle size of from 100 to 500 nm, a relative thickening action of greater than 2.0 based on an amount of 2% by weight of silica in a silicone oil with optimal dispersion, and a proportion of coarse particles less than 0.03% by weight based on the weight of the fumed silica and fewer than 100,000 coarse particles per 1 milliliter of a 10% by weight aqueous dispersion of the silica, comprising introducing reaction gases into the reactor through a reactor nozzle and reacting the reaction gases in a flame in an amount of minimally 100 kg/h of at least one silicon compound, an amount of combustion gas of at least 100 m$^3$ (STP)/h and an amount of air with more than 20% by volume of oxygen of at least 300 m$^3$ (STP)/h, an exit velocity of the gases at the reactor nozzle being between 10 and 200 m/s, and the gas velocity and the temperature at the reactor nozzle and in the reactor having a radially homogeneous distribution.

2. The process of claim 1, wherein the reactor nozzle is located proximate the top of the reactor and further air is introduced into the reactor outside the nozzle at the top of the reactor.

3. The process for preparing fumed silica of claim 1, wherein the silicon compounds comprise silicon tetrachloride, methyltrichlorosilane, hydrotrichlorosilane, or any mixtures thereof.

4. The process for preparing fumed silica of claim 1, wherein the size of the combustion zone can be varied.

5. The process for preparing fumed silica of claim 1, wherein the gas velocity of the reaction gases at the reactor nozzle is between 10 and 200 m/s.

6. The process for preparing fumed silica of claim 1, wherein the gas velocity of the reaction gases at the reactor nozzle is adjusted between 10 and 200 m/s during the course of the process.

7. The process for preparing fumed silica of claim 1, wherein further inert gas is introduced into the reaction in addition to nitrogen contained in air.

8. The process for preparing fumed silica of claim 1, wherein, in addition to the combustion gas necessary for the reaction, further combustion gas for reduction of molecular chlorine gas is introduced into the reaction.

9. The process for preparing fumed silica of claim 1, wherein the reaction gases are fed in from two reactor nozzles spaced apart.

10. The process for preparing fumed silica of claim 1, wherein the reaction gases are premixed.

11. The process for preparing fumed silica of claim 1, wherein a further reactor nozzle which surrounds, in an annular manner, the reactor nozzle from which the reaction gases emerge, is used to additionally supply pure oxygen, air, or an air-oxygen mixture or to additionally supply pure nitrogen or air or air-nitrogen mixtures.

12. The process for preparing fumed silica of claim 1, wherein the hot reaction gases are quenched.

13. The process for preparing fumed silica of claim 1, wherein a combustion gas is added to the flame at least one site other than the reactor nozzle in the reactor chamber.

14. The process for preparing fumed silica of claim 1, wherein, based on a central longitudinal axis of the flame, the deviations from symmetry in the gas velocities are less than 50%.

15. The process for preparing fumed silica of claim 1, wherein the central longitudinal axis of the flame deviates from the central longitudinal axis through the centers of nozzle cross section and reactor cross section by less than 30°.

16. The process for preparing fumed silica of claim 1, wherein the greatest gas velocity is less than twice the smallest gas velocity at equal distances from the nozzle and at equal distances from the central longitudinal axis through the centers of nozzle cross section and reactor cross section.

17. The process for preparing fumed silica of claim 1, wherein the deviation from an ideal radial distribution of the gas velocity based on a central axis of the flame, determined as the quotient of two diameters at right angles to one another, determined as the quotient of the smaller diameter divided by the greater diameter, is greater than 0.2 at the same distance from the nozzle.

18. The process for preparing fumed silica of claim 1, wherein the cpk value of the process for a dataset of analysis methods typical for silica is greater than 1.0.

19. The process for preparing fumed silica, of claim 1 wherein the throughput of fumed silica is greater than 125 Kg/h.

20. The process for preparing fumed silica of claim 1, wherein the throughput of fumed silica is greater than 300 Kg/h.

21. The process for preparing fumed silica of claim 1, wherein the throughput of fumed silica is greater than 750 Kg/h.

22. The process for preparing fumed silica of claim 1, wherein the throughput of fumed silica is greater than 1000 Kg/h.

23. Fumed silica prepared by the process of claim 1, having a thickening action, described as the relative thickening η/η0 in a silicone oil with optimal dispersion, of greater than 2.0, a mean sphere-equivalent hydrodynamic diameter in water at pH greater than 9 of from 150 to 300 nanometers, a boron content of less than 1 ppm, a titanium content of less than 1 ppm, an iron content of less than 1 ppm, an aluminum content of less than 10 ppm, a nickel content of less than 1 ppm and a copper content of less than 1 ppm.

24. The fumed silica of claim 23, wherein the silica contains fewer than 100,000 coarse particles larger than 10 μm per 1 milliliter, based on a from 1 to 50% by weight aqueous dispersion.

25. A molding, coating or impregnation, containing silica of claim 23.

26. A powder or toner, containing silica of claim 23.

* * * * *